Patented May 24, 1932

1,859,998

UNITED STATES PATENT OFFICE

SVEND S. SVENDSEN, OF CHICAGO, ILLINOIS, ASSIGNOR TO CLAY REDUCTION COMPANY, OF CHICAGO, ILLINOIS, A CORPORATION OF ILLINOIS

HYDRATED SILICA

No Drawing. Application filed December 23, 1927. Serial No. 242,291.

This invention relates to the production of hydrated silica from a silicious material such as silica and silicates generally.

According to the invention the silicious material is treated with ammonium fluoride or bifluoride and silicon ammonia fluorine compounds are produced. These compounds are volatilized and converted into hydrated silica by the action of water and ammonia.

Metallic silicates or substances containing them can be subjected to this treatment directly. In treating silica in the form of quartz it is found to be necessary to subject it to a preliminary treatment in order to facilitate the action of the ammonium fluoride or bifluoride thereon. A suitable preliminary treatment is to heat the quartz to a bright red heat and suddenly cool it by immersion in water. It is then pulverized and is ready for use.

The silicious material is mixed with a solution of ammonium fluoride and the mixture is heated to between 34° and 100° C., preferably between 60° and 100° C., while stirring, until the ammonium fluoride is converted into ammonium silico-fluoride as follows:

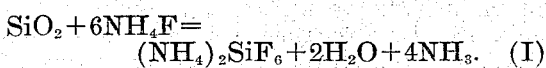

$$SiO_2 + 6NH_4F = (NH_4)_2SiF_6 + 2H_2O + 4NH_3. \quad (I)$$

The ammonia liberated is collected and may be used later in the process.

On further evaporation and heating ammonium silicofluoride reacts with silica as follows:

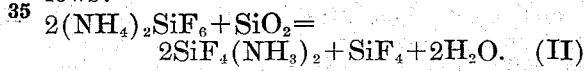

$$2(NH_4)_2SiF_6 + SiO_2 = 2SiF_4(NH_3)_2 + SiF_4 + 2H_2O. \quad (II)$$

By continuous heating the silicon diammino tetrafluoride is volatilized together with the silicon fluoride and passed into a precipitating chamber containing aqueous ammonia. On coming into contact with ammonia the silicon fluoride is converted into silicon diammino tetrafluoride.

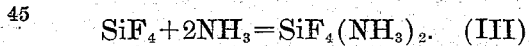

$$SiF_4 + 2NH_3 = SiF_4(NH_3)_2. \quad (III)$$

An excess of ammonium fluoride may be employed so that a part of the ammonium silicofluoride is not converted into silicon diammino tetrafluoride. This ammonium silicofluoride is also volatilized and collected in aqueous ammonia. The volatilization occurs about 300° C. The following reactions take place in the aqueous ammonia at temperatures below 34° C.:

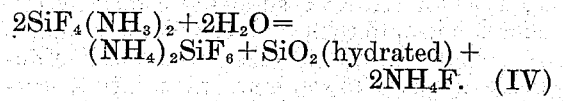

$$2SiF_4(NH_3)_2 + 2H_2O = (NH_4)_2SiF_6 + SiO_2(\text{hydrated}) + 2NH_4F. \quad (IV)$$

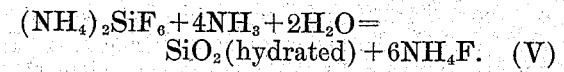

$$(NH_4)_2SiF_6 + 4NH_3 + 2H_2O = SiO_2(\text{hydrated}) + 6NH_4F. \quad (V)$$

It is thus apparent that on heating the silicious material with the ammonium-fluoride, ammonia-silicon-fluorine compounds are formed, and by employing suitable temperatures are volatilized from the reaction mixture. These compounds may be siliconfluoride-ammonia, ammonium-silicofluoride or mixtures thereof, according to the relative proportion of the silica to the ammonium-fluoride in the reaction mixture.

The hydrated silica thus produced from the silicon diammino tetrafluoride (Equation IV) by the action of water is white and opaque, while the hydrated silica precipitated by ammonia from ammonium silicofluoride (Equation V) is transparent and has a tendency to form silica sol.

The hydrated silica is washed free from ammonium fluoride which is recovered and reused in the initial part of a subsequent process. The silica may be used for any suitable purposes, for example, as an adsorbent or the like. It may be formed and pressed into any desired shape and after drying and ignition acquires considerable strength. It is thought that the transparent hydrated silica acts as a binder for the opaque variety.

The opaque variety of hydrated silica may be obtained separately by passing silicon diammino tetrafluoride into water in the absence of ammonia and filtering from the precipitate. The hydrated silica thus produced is white and clay-like to the touch. The filtrate contains ammonium silicofluoride. Hydrated silica may be precipitated therefrom by adding ammonia. This transparent hydrated silica is more highly "soluble" than hydrated silicas produced by methods heretofore known, that is, it is more readily transformed into a sol by dilution.

The residue from which the silicon compounds have been volatilized contains metallic fluorides. The fluorine may be recovered in the form of ammonium fluoride by passing ammonium chloride or a mixture of ammonia and hydrochloric acid gas therethrough at high temperature. In this operation certain chlorides such as ferric and aluminum, if these metals are present, may be volatilized and recovered. No claim is made in the present application for such production of aluminum chloride since that method is described and claimed in my co-pending application Serial No. 191,267, filed May 13, 1927, of which this is in part a continuation.

The invention will be readily understood from the following examples:

*Example I.*—210 lbs. of quartz are heated to a bright red heat, suddenly cooled by immersion in water and pulverized. The quartz is now mixed with 555 lbs. of ammonium fluoride dissolved in water and the mixture heated above 34° C. and preferably between 60° and 100° C. In accordance with Equation I the ammonium fluoride combines with 150 lbs. of the quartz forming about 445 lbs. of ammonium silicofluoride and liberating about 170 lbs. of ammonia. On evaporation to dryness and further heating the remaining 60 lbs. of quartz react with 356 lbs. of ammonium fluosilicate giving 276 lbs. of silicon diammino tetrafluoride and 104 lbs. of silicon fluoride.

The remaining 89 lbs. of ammonium silicofluoride, the 276 lbs. of silicon diamino tetrafluoride and 104 lbs. of silicon fluoride are volatilized at about 300° C. into a precipitation chamber containing an aqueous solution of at least 170 lbs. of ammonia. By reaction of the silicon fluoride with 34 lbs. of the ammonia gas a further 138 lbs. of silicon diammino tetrafluoride are produced in accordance with Equation III. The 414 lbs. of silicon diammino tetrafluoride react with 54 lbs. of water giving 267 lbs. of ammonium silicofluoride, 90 lbs. of hydrated silica (as $SiO_2$) and 111 lbs. of ammonium fluoride. This hydrated silica is white and opaque.

The 356 lbs. of ammonium silicofluoride react with 136 lbs. of ammonia and 72 lbs. of water to yield 120 lbs. of transparent hydrated silica (as $SiO_2$) and 444 lbs. of ammonium fluoride. Thus the amount of ammonia necessary in the final stage of the process is theoretically the same as that liberated in the first stage of the process and the recovery of ammonium fluoride is theoretically equal to that used in the first stage.

The relative amounts of the two kinds of hydrated silica can be controlled within wide limits by adjusting the relative proportions of silica and ammonium fluoride in the initial mixture. Thus starting with 180 lbs. of silica and 444 lbs. of ammonium fluoride, 90 lbs. of the opaque variety and 90 lbs. of the transparent variety (as $SiO_2$) are obtained.

*Example II.*—The procedure with talc is similar to that described in Example I with reference to silica. No preliminary heat treatment is necessary and the amount of ammonium fluoride must be sufficient to convert the metals into fluorides and the silica into the desired proportions of ammonium silicofluoride and silicon diammino tetrafluoride. Thus assume that 100 lbs. of talc containing 63.5% silica and 31.7% of magnesia are treated with 215.4 lbs. ammonium fluoride.

The ammonium fluoride combines with 58.2 lbs. of the silica giving 172.7 lbs. of ammonium silicofluoride and 66 lbs. of ammonia in accordance with Equation I. On further heating 141 lbs. of the ammonium silicofluoride react with the 31.7 lbs. of magnesia according to the equation $$(NH_4)_2SiF_6 + MgO = MgF_2 + SiF_4(NH_3)_2 + H_2O. \quad (VI)$$

to form 109.4 lbs. of silicon diammino tetrafluoride and 49.1 lbs. of magnesium fluoride.

The remaining silica (5.3 lbs.) reacts with the remaining ammonium fluosilicate (31.7 lbs.) to give 24.6 lbs. silicon diammino tetrafluoride and 9.2 lbs. of silicon fluoride in accordance with Equation II. If a slightly less quantity of ammonium fluoride or a talc containing slightly more magnesia is used, substantially no silicon fluoride is formed.

The silicon fluoride forms with the ammonia 12.3 lbs. of silicon diammino tetrafluoride. On reaction with water and ammonia according to Equations IV and V 31.75 lbs. (as $SiO_2$) of each modification of hydrated silica are formed.

The fluorine is recovered from the magnesium fluoride by passing an equimolecular mixture of hydrochloric acid gas and ammonia vapor therethrough at a temperature of about 400° C. to 500° C. The ammonium fluoride is volatilized and is precipitated by cooling the fume to between 200 and 300° C.

*Example III.*—Dried clay containing feldspar is mixed, on hollanders, with ammonium fluoride solution containing sufficient fluoride to convert the silica into silicon-diammino tetrafluoride and the metallic oxides into fluorides. The mixture is heated to between 34° and 100° C. preferably between 60° and 100° C. The ammonium fluoride is thereby dissociated into ammonia and ammonium bifluoride; the latter attacks the clay, reforming normal ammonium fluoride which is again decomposed. Ammonia gas is evolved and recovered. The final result of this reaction is principally ammonium silicofluoride $((NH_4)_2SiF_6)$, metallic fluorides and metallic oxides.

The mixture is evaporated to dryness and heated; the ammonium silicofluoride gives off one-third of its fluorine, which completely converts the remaining oxides into fluorides. The ammonium silicofluoride is thereby converted into silicon diammino tetrafluoride $(SiF_4(NH_3)_2)$.

The mixture is now heated to about 300° C. thereby volatilizing the volatile fluorides, principally silicon fluoride ammonia. The volatile fluorides are collected, cooled and decomposed by addition of water and ammonia at a temperature maintained below 34° C., to yield ammonium fluoride and hydrated silica. The ammonium fluoride is removed by water and is recovered, and the hydrated silica is washed, dried and ignited or otherwise prepared for use. The residue may be further treated for the recovery of fluorine, aluminum chloride or alumina as described and claimed in the aforesaid application.

The quantities of reagents employed depend upon the quantity and composition of the initial clay. For example, assuming 120 tons of clay of the composition

|  | Per cent |
|---|---|
| Alumina | 25 |
| Silica | 60 |
| Ferrous oxide | 3 |
| Lime | 2 |
| Soda | 4 |
| Potash | 6 | then a solution containing 262 tons of ammonium fluoride will be required to convert the silica into silicon fluoride ammonia and the metallic oxides into metallic fluorides in the next phase of the process. In this part of the process 79.2 tons of ammonia gas are evolved and 165.6 tons of silicon diammino tetrafluoride are volatilized. The silicon fluoride ammonia is decomposed by 40.8 tons of ammonia and 172.8 tons of water forming 177.6 tons of ammonium fluoride and hydrated silica. The ammonium fluoride is washed out of the silica by water and the silica is dried, yeilding 93.6 tons.

Although the invention has been described in connection with the details of specific examples thereof, it is not intended that such details shall be regarded as limitations upon the scope of the invention except in so far as included in the accompanying claims.

I claim:

1. The method of converting silica into hydrated silica which comprises heating silica to a bright red heat, suddenly cooling the silica, treating the silica with ammonium fluoride above 34° C., and heating the mixture to volatilize ammonia silicon fluorine compounds therefrom, collecting said compounds and treating them with water and ammonia below 34° C., thereby transforming them into hydrated silica and ammonium fluoride.

2. The method of producing hydrated silica which consists in treating silicious material with ammonium fluoride above 34° C., the silicious material being in excess heating to about 300° C. to expel ammonia and form and volatilize a mixture of silicon fluoride, silicon diammino tetrafluoride, and ammonium silicofluoride, treating the silicon fluoride with ammonia, thereby forming silicon diammino tetrafluoride, treating the silicon diammino tetrafluoride with water thereby forming ammonium fluoride, hydrated silica and ammonium silicofluoride, and treating the ammonium silicofluoride with water and ammonia below 34° C., thereby forming ammonium fluoride and hydrated silica, and removing the ammonium fluoride.

3. The method of producing a mixture of opaque and transparent hydrated silicas in predetermined proportions, which consists in treating a mixture of silicon diammino tetrafluoride and ammonium silicofluoride in the desired proportion with water in the presence of ammonia.

4. A mixture of clay-like opaque and transparent hydrated silicas in predetermined proportions produced by the reaction of a mixture of silicon diammino tetrafluoride and ammonium silicofluoride in selected proportions with water in the presence of ammonia.

5. The steps in the method of producing hydrated silica which comprises heating material containing silica with sufficient ammonium fluoride to form and volatilize ammonia silicon fluorine compounds comprising silicon diammino tetrafluoride therefrom, treating said compounds with water to produce ammonium silicofluoride, ammonium fluoride and opaque hydrated silica, and removing said silicofluoride from the hydrated silica.

6. The method of producing hydrated silica which comprises heating material containing silica with sufficient ammonium fluoride to form and volatilize ammonia silicon fluorine compounds comprising silicon diammino tetrafluoride therefrom, treating said compounds with water to produce ammonium silicofluoride, ammonium fluoride and opaque hydrated silica, removing said silicofluoride from the hydrated silica and treating said silicofluoride with ammonia in the presence of water to produce transparent hydrated silica and ammonium fluoride.

7. The method of producing hydrated silica which comprises heating material containing silica with ammonium fluoride, the proportion of silica being such as to form ammonium silicofluoride and silicon-diammino tetrafluoride, volatilizing the silicondiammino tetrafluoride and ammonium silicofluoride therefrom, and treating the silicon-diammino tetrafluoride and ammonium silicofluoride with water and ammonia to produce ammonium-fluoride and hydrated silica.

8. The method of producing hydrated silica which comprises heating material containing silica with sufficient ammonium fluoride to form and volatilize ammonia-silicon-fluorine compounds comprising silicon-diammino tetrafluoride therefrom, treating said compounds with water to produce ammonium silicofluoride, ammonium fluoride and opaque hydrated silica, removing said silicofluoride from the hydrated silica, treating said silicofluoride with ammonia in the presence of water at below 34° C. to produce transparent hydrated silica and ammonium fluoride, and washing said ammonium fluoride from said silica.

9. The method of treating silica which comprises heating it to a bright red heat, suddenly cooling it, and subjecting it to the action of ammonium fluoride.

In testimony whereof I have hereunto set my hand this 1st day of December, 1927.

SVEND S. SVENDSEN.